United States Patent
Detore et al.

(10) Patent No.: US 7,080,573 B2
(45) Date of Patent: Jul. 25, 2006

(54) HYBRID COMPOSITE FLYWHEEL RIM AND ITS MANUFACTURING METHOD

(75) Inventors: William L. Detore, Puyallap, WA (US); Tetsuyuki Kyono, Kent, WA (US)

(73) Assignee: Toray Composites (America), Inc., Tacoma, WA (US)

( * ) Notice: Subject to any disclaimer, the term of this patent is extended or adjusted under 35 U.S.C. 154(b) by 599 days.

(21) Appl. No.: 10/035,513

(22) Filed: Oct. 19, 2001

(65) Prior Publication Data

US 2002/0083791 A1    Jul. 4, 2002

Related U.S. Application Data

(60) Provisional application No. 60/242,222, filed on Oct. 20, 2000.

(51) Int. Cl.
    *H02K 7/02*    (2006.01)
(52) U.S. Cl. ........................................ 74/572
(58) Field of Classification Search ................... 74/572
    See application file for complete search history.

(56) References Cited

U.S. PATENT DOCUMENTS

| | | | |
|---|---|---|---|
| 3,602,067 A | * | 8/1971 | Wetherbee, Jr. ............... 74/572 |
| 4,370,899 A | * | 2/1983 | Swartout ...................... 74/572 |
| 5,122,417 A | * | 6/1992 | Murakami et al. ........... 428/371 |
| 5,285,699 A | * | 2/1994 | Walls et al. ................... 74/572 |
| 6,029,350 A | * | 2/2000 | Maass et al. .................. 29/894 |
| 6,247,382 B1 | * | 6/2001 | Umeki et al. .................. 74/572 |
| 6,299,718 B1 | * | 10/2001 | Kimura et al. ............... 156/173 |

OTHER PUBLICATIONS

*Composite Materials Handbook*, 2nd Ed, M. Schwartz, United Technologies Corp., McGraw-Hill, Inc. 1992, Chapter Two, p. 2.124-.

*Carbon Fibers*, 2nd Ed, J. B. Donnet, Roop Chand Bansal, Marcel Dekker, Inc., 1990, pp. 381-382.

Kinetic Energy Storage Theory and Practice of Advanced Flywheel Systems, G. Genta, Butterworths, 1985, pp. 128, 139-140.

* cited by examiner

*Primary Examiner*—Vicky A. Johnson

(57) ABSTRACT

A composite flywheel rim has multiple fiber layers in each of a plurality of radially contiguous zones. The layers in the intermediate zones each have a mixture of carbon fiber tows and glass fiber tows. The ratio of carbon fiber tows to glass fiber tows in each layer of any single zone is constant and the ratio incrementally increases zone-by-zone radially toward the outside of the rim, and the distribution of carbon fiber tows is macroscopically uniform in each zone. The flywheel rim is made by winding a band of fiber tows, impregnated with wet resin, onto a mandrel. The macroscopically uniform distribution can be achieved by controlling the correlation between lead rate of the fiber band as it is wound onto the mandrel per mandrel revolution and the winding length. Carbon fiber tow spacing and position in the band, and a width of a carbon fiber tow also affect the lay up pattern, however, the most effective and the easiest way to change the lay up pattern with constant parameters is by controlling the winding length.

4 Claims, 3 Drawing Sheets

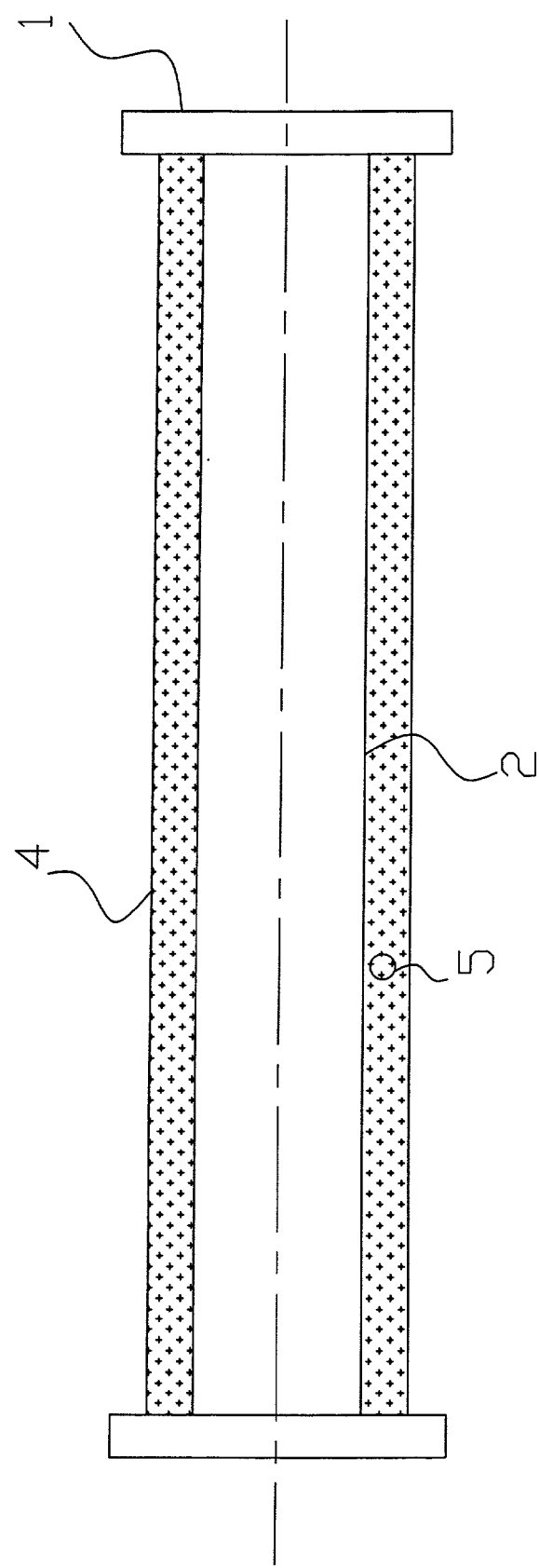

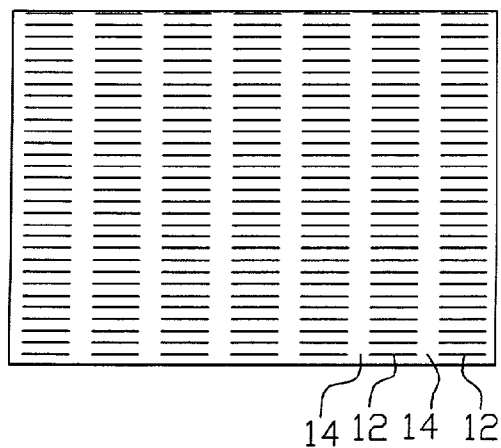
Fig. 3 Stocked Carbon Fiber Distribution
Fig. 4 Cross Hatched Carbon Fiber Distribution
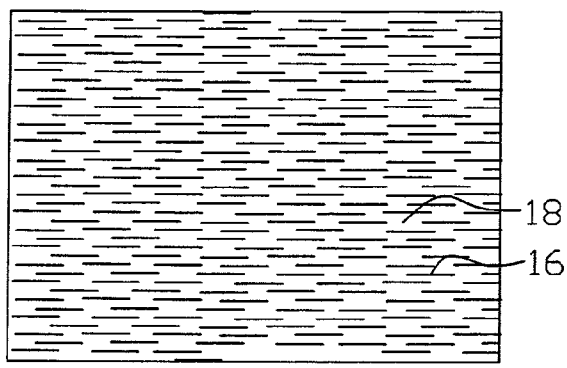
Fig. 5 Random or Uniform Carbon Fiber Distribution

HYBRID COMPOSITE FLYWHEEL RIM AND ITS MANUFACTURING METHOD

This is related to U.S. Provisional Application 60/242,222 filed on Oct. 20, 2000 and entitled "Hybrid Composite Flywheel Rim and its Manufacturing Method".

BACKGROUND OF THE INVENTION

Flywheel systems have been used for many years for storing energy in a system, and then releasing that stored energy back into the other system. Flywheel systems provide a smoothing effect to the operation of internal combustion engines and other kinds of power equipment. More recently, flywheel systems are being used in electrical applications for uninterruptible power supplies, UPS, by storing and releasing energy. Electrical energy storage flywheel systems, which include a flywheel rotor and an attached motor/generator, convert electrical energy to mechanical energy by using the motor to accelerate the flywheel rotor. The energy is stored kinetically in the motion of the flywheel rotor. Mechanical energy is then later converted back to electrical energy when required by using the generator to decelerate the spinning flywheel rotor. Using flywheel systems instead of conventional electrochemical batteries for electrical energy storage offers the advantages of potential higher reliability, longer life and much higher power capability if desired.

Earlier flywheel UPS systems used flywheel rotors constructed of steel due to simplicity, however the performance of such flywheel rotors are low with tip speeds typically limited to around 400 m/sec or less. In comparison, a flywheel rotor comprising composite flywheel rims can be operated at much higher speeds (700–1000 m/sec). The higher performance is the result of the increased strength to weight ratio and also to some extent the capability for more efficient mechanical property tailoring that is possible when using high strength glass and carbon fibers. Because the energy stored for a given flywheel design is proportional to the square of the tip speed but is only linearly proportional to the flywheel rotors(rim and hub)mass, researchers have fervently pursued the much the higher speed composite flywheel rims.

To be competitive in the power quality and reliability industry, flywheel based UPS systems must compete against conventional electrochemical battery based UPS which have low reliability but low cost. To compete effectively, high performance composite flywheel rims must be manufactured at low cost. Among the many of composite fabrication methods, it is generally accepted that filament winding offers the greatest potential for composite flywheel rims. Filament winding can be a highly automated process that is capable of high-speed material deposition and very high part quality, which is inherently needed for highly stressed flywheel rim. Filament wound flywheel rims are typically designed as thick, predominately hoop wound composite rings that can be spun to very high speeds and are hence very effective for energy storage.

One of the key issues to have workable composite flywheel rim is strain matching between the ID of the rim and OD of the hub. Various ways have been used to achieve this strain matching. For example, it is well known that various fibers can be used for making a composite flywheel rim to match the ID growth of a rim to the OD growth of a hub. Generally, fiber having lower elastic modulus is placed inside and fibers having higher elastic modulus on outside. In the case of glass/carbon fiber hybrid composite rim, the mixture ratio between glass and carbon fibers can be determined by considering not only relationship between hub OD growth and rim ID growth but also rotor cost. More glass fibers results in lower cost, but a greater mismatch of the diameter growths could be generated during rotor spinning.

The first example of glass/carbon hybrid rim is a rim in which all glass fiber composite is on the inside and all carbon fiber composite is on the outside. This rotor can be easily made by in situ curing filament winding technology proposed in utility patent application Ser. No. 09/951844. The drawback of a rim made of all-glass fiber layers and all-carbon fiber layers is stress and strain discontinuities at the interface between glass and carbon composites which may result in possible cracks during fabrication and operation.

On the other hand, commingling the glass and carbon fibers has been proposed to avoid the discontinuities at the interface above mentioned in the composite industry. In other words, the second example is a composite rim in which the mixture ratio of carbon fiber versus glass fiber is increased continuously in the radial direction, and the carbon and glass fiber filaments are uniformly dispersed microscopically. This can be a desirable solution, however it is not easy to make a rim like this and must result in high cost.

The other practical solution is a rim in which the mixture ratio of carbon fiber versus glass fiber increases incrementally from inside toward outside of the rim. That is, the ratio of the carbon fiber versus glass fiber is constant in each layer and can be determined as a function of the number of tows within a fiber band during filament winding. When winding layers with carbon fiber tows and glass fiber tows, it is convenient to lay down a large number of tows together in a band with each revolution of the mandrel on which they are being wound. However, it has been discovered that occasionally, by chance, the carbon fiber tows in the band are laid down in a radially aligned pattern, as shown in FIG. 1, which produces an undesirable distribution of glass and carbon fibers and could result in large internal shear forces between the aligned or stacked carbon fiber regions and the adjacent aligned or stacked glass fiber regions.

SUMMARY OF THE INVENTION

The disclosed inventions are a composite flywheel rim having multiple hybrid fiber layers in each of which mixture ratio of carbon fibers versus glass fibers is constant and the ratio incrementally increases layer by layer toward outside of the rim and the distribution of carbon fibers is macroscopically uniform in each layer, and its manufacturing method.

It has been found more macroscopically uniform fiber distribution may be important to achieve uniform stress distribution during rotor spinning even with the constant mixture ratio between glass and carbon fibers.

The macroscopically uniform distribution can be achieved by controlling the correlation between lead rate of fiber band per mandrel revolution and the winding length. Carbon fiber tow spacing and position in the band, and a width of a carbon fiber tow also affect the lay up pattern, however, the most effective and the easiest way to change the lay up pattern with constant parameters is by controlling the winding length.

DESCRIPTION OF THE DRAWINGS

The invention and its many attendant benefits and advantages will become better understood upon reading the description of the preferred embodiment in conjunction with the following drawings, wherein:

FIG. 2 is a sectional elevation of the mandrel shown in FIG. 1 after the fiber winding operation has been completed;

FIG. 3 is a sectional diagram of a magnified cross section of composite flywheel rim, cut along a radial plane parallel to the axis of the rim, illustrating an undesirable stacked fiber distribution;

FIG. 4 is a sectional diagram of a magnified cross section of composite flywheel rim, cut along a radial plane parallel to the axis of the rim, illustrating a macroscopically cross hatched fiber distribution; and FIG. 5 is a sectional diagram of a magnified cross section of composite flywheel rim, cut along a radial plane parallel to the axis of the rim, illustrating a preferred macroscopically random or uniform distribution of carbon fibers amongst the glass fibers.

DESCRIPTION OF THE PREFERRED EMBODIMENT

Figure 1:
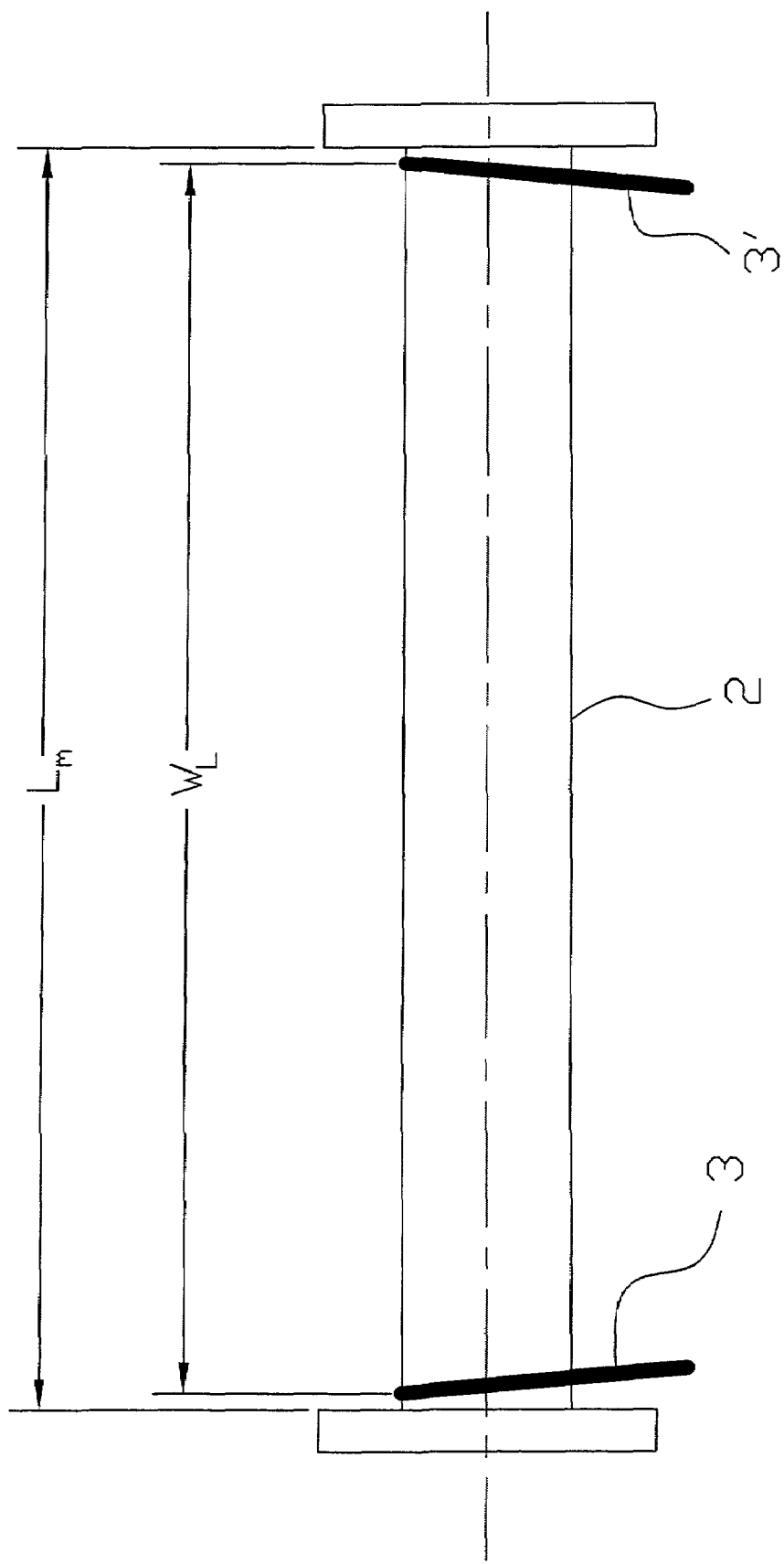
FIG. 1 is a schematic plan view of a mandrel on which is being wound a band of resin-impregnated fiber tows, illustrating the position of the fiber band at its two extreme end positions.

Turning to the drawings, wherein like characters designate identical or corresponding parts, and more particularly to FIG. 1 thereof, a mandrel 2 is shown for winding resin-impregnated tows in a fiber band 3 to produce an elongated annular composite "log" 4, shown in FIG. 2, which can be cut into numerous shorter annular flywheel rims. The process and apparatus for winding the fiber tows onto the mandrel is illustrated in fUll detail in U.S. patent application Ser. No. 09/951,844 entitled "High-Speed Manufacturing Method for Composite Flywheels" filed on Sep. 11, 2001 by Christopher W. Gabrys and assigned to the assignee of this application. The disclosure of this application Ser. No. 09/951,844 is incorporated herein by reference.

The mandrel 2 has two end flanges 1 which help confine the resin-impregnated fiber tows on the ends of the mandrel 2 as the fiber band 3 is being wound. The length ($L_m$) of the mandrel 2 is the full length between the facing surfaces of the two flanges 1. The fiber band 3 can be made up of a number of fiber tows: one example, described below, has twenty fiber tows in the fiber band. The fiber band can be made up of a mixture of carbon fiber tows and glass fiber tows which are impregnated with wet resin and wound onto the mandrel by a winding apparatus which traverses back and forth lengthwise of the mandrel as the mandrel turns and winds the fiber band in layers onto the mandrel. A number of such layers is laid down in a zone, in which the ratio of glass fiber tows to carbon fiber tows is constant in each layer. The ratio of glass fiber tows to carbon fiber tows can be incrementally increased in the next zone of multiple layers to produce a zone with a greater proportion of carbon fiber tows. The proportion of carbon fiber tows can be further increased in each subsequent zone until the last zone in which all the tows may be all carbon fiber tows. For example, a composite flywheel made in accordance with this approach could be made in 5 contiguous zones from inside to radially outside, as follows: 1. 10% CF, 90% GF; 2. 20% CF, 80% GF; 3. 50% CF, 50% GF; 5. 100% CF. As used herein, "GF" is glass fiber and "CF" is carbon fiber.

When the fiber band 3 is wound onto the mandrel 2, an undesirable distribution of glass and carbon fiber tows, can occur, as shown in FIG. 3, wherein the carbon fiber tows are radially stacked in aligned regions or columns 12, separated by regions or columns 14 of radially stacked glass fiber tows, all in an epoxy matrix. The forces action on the flywheel rim during high speed rotation can be substantial and the different modulus of elasticity of the glass and carbon fibers in adjacent regions can result in shear forces between the adjacent regions. These shear forces have never resulted in any known failures or damage to any flywheel rim, but it is thought best to avoid the possibility by winding the fiber tows on the mandrel in such a way as to distribute the carbon fiber tows more uniformly amongst the glass fiber tows. The goal is to wind the fiber band onto the mandrel in such a way the carbon fiber tows lie in a macroscopically uniform distribution in each zone.

We have found that that goal can be accomplished by controlling the correlation between lead rate of the fiber band as it is wound onto the mandrel per mandrel revolution and the winding length. Specifically, it has been found that various lay up patterns can be obtained cyclically by changing the winding length $W_L$ while holding constant other parameters such as lead rate $L_R$ per revolution of mandrel, mandrel diameter, fiber band width and position of carbon fiber tow(s) within a fiber band of glass fiber tows. The winding length $W_L$ is defined as the traverse distance of fiber band center line between one end of the mandrel 2 and the other end during winding, as shown in FIG. 1. The lead rate $L_R$ is the longitudinal distance between adjacent turns of a band of fiber, measured center-to-center, as it is wound on the mandrel. The lead rate $L_R$ is often less than the fiber band width since the band are usually made to overlap. To make a good composite rim, the value of $L_R$ is no greater than the fiber band width. This is the most practical way to make a composite rim strong enough in the hoop direction by laying up fiber axis as close as possible to hoop direction of the rim.

In the case of the figures we show here, winding parameters are as follows.

| FIG. | Winding Length $W_L$ (inch) |
|---|---|
| 3 | 165.5 |
| 3 | 166.0 |
| 4 | 165.8 |
| 4 | 165.7 |
| 5 | 165.9 |
| 5 | 165.6 |

Other parameters are constant, as follows.

| | |
|---|---|
| lead rate $L_R$: | 1.5 inch/revolution |
| band width: | 3 inch |
| # of tow: | carbon fiber tow 2 |
| | glass fiber tow 18 |
| mandrel diameter: | 12.45 inch |

The position of carbon fiber tows in the fiber band are #1 and #15 in the following figure. The other positions are occupied by glass fiber tows

| 1 | 2 | 3 | 4 | 5 | 6 | 7 | 8 | 9 | 10 | 11 | 12 | 13 | 14 | 15 | 16 | 17 | 18 | 19 | 20 |

It is generally described as follows. The undesirable stacked fiber pattern can be avoided, and the desirable random or uniform carbon fiber tow distribution can be attained, by satisfying the following equation.

$$W_L = (N + B/A) \cdot L_R.$$

$$W_L + L_R < L_m$$

N: Maximum integer obtained when $W_L$ is divided by $L_R$
A: integer larger than B
B: integer smaller than A
B/A \ 1, ½, ⅓, ¼
$W_L$: Winding Length (inch)
$L_R$: Lead Rate (inch)
$L_m$: Distance between inner faces of two mandrel flanges (inch)

$$m \cdot L_R = n \cdot Sp$$

m: integer ☐2
n: integer ☐2
Sp: fiber space amongst other fiber (inch)

Wet filament winding, where a thermoset resin such as epoxy is impregnated into raw fibers during the winding operation, is the preferred fabrication method for a composite rim. The fibers are arranged in tows and the macroscopic distribution of the carbon fiber tows is preferably uniform or random throughout the rim. The carbon fibers and glass fibers are concentrated in these tows, so the distribution of the actual fibers is not uniform or random, but the distribution of the tows is uniform or random. This is the meaning of "macroscopic" uniform or random distribution.

Obviously, numerous modifications and variations of the described preferred embodiment are possible and will occur to those skilled in the art in light of this disclosure of the invention. Accordingly, it is intended that these modifications and variations, and the equivalents thereof, be included within the spirit and scope of the invention as defined in the following claims, wherein I claim.

We claim:
1. A hybrid composite flywheel rim comprising:
   a cylindrical fiber-wound structure having at least two different types of fibers, including a first fiber type and a second fiber type, impregnated with a thermosetting resin and wound in an annulus on a mandrel, said two different fibers having different elastic moduli;
   said fiber is distributed in said cylindrical fiber-wound structure as bands of tows, each tow having only a single type of fiber, said tows lying in a lay-up pattern that is defined by the correlation between lead rate per mandrel revolution and winding length to produce a random distribution of said first fiber type amongst said second fiber type macroscopically.

2. A hybrid composite flywheel rim, comprising:
   fibers having different elastic moduli, said fibers including carbon fiber, and at least one other fiber including glass fiber, said fibers fixed in a matrix of thermosettiug resin;
   said fiber is distributed in said cylindrical fiber-wound structure as bands of tows, each tow having only a single type of fiber, said tows lying in a lay-up pattern that is defined by the correlation between lead rate per mandrel revolution and winding length to produce of said carbon fiber is distributed amongst the other fiber in a cross hatch pattern macroscopically.

3. A hybrid composite flywheel rim as defined claim 2, wherein: the following equation is satisfied:

$$W_L = (N + B/A) \cdot L_R$$

$$W_L + L_R < L_m$$

N: Maximum integer obtained when $W_L$ is divided by $L_R$
A: integer larger than B
B: integer smaller than A
B/A ∴ 1, ½, ⅓, ¼
$W_L$: Winding Length (inch)
$L_R$: Lead Rate (inch)
$L_m$: Distance between inner faces of two mandrel flanges (inch)

$$m \cdot L_R = n \cdot Sp$$

m: integer Δ2
n: integer Δ2
Sp: fiber space amongst other fiber (inch).

4. A composite flywheel rim, comprising:
   an annular structure having a plurality of zones, each with multiple fiber layers in a resin matrix, each said fiber layer having a mixture of carbon fiber tows and glass fiber tows wound in a fiber band with a predetermined lead rate into said annular structure, said band having a ratio of tows that is constant in each layer of any single zone, and said ratio incrementally increases zone-by-zone radially toward outside zones of said rim;
   wherein said predetermined lead rate, in correlation with the winding length, ensures that said carbon fiber tows lie in a macroscopically uniform distribution in each zone.

* * * * *